(12) United States Patent
Mori et al.

(10) Patent No.: US 7,965,612 B2
(45) Date of Patent: *Jun. 21, 2011

(54) OPTICAL HEAD, AND INFORMATION RECORDING-AND-REGENERATION APPARATUS

(75) Inventors: Eishin Mori, Kyoto (JP); Akihiro Arai, Kizu-cho (JP); Fumitomo Yamasaki, Nara (JP); Joji Anzai, Minoh (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/641,734

(22) Filed: Dec. 18, 2009

(65) Prior Publication Data

US 2010/0091636 A1    Apr. 15, 2010

Related U.S. Application Data

(62) Division of application No. 11/272,822, filed on Nov. 15, 2005, now Pat. No. 7,656,775.

(30) Foreign Application Priority Data

Nov. 15, 2004    (JP) .................................. 2004-330212

(51) Int. Cl.
*G11B 7/135* (2006.01)
*G11B 7/00* (2006.01)
*G11B 7/20* (2006.01)

(52) U.S. Cl. ............. 369/116; 369/94; 369/112.24; 369/112.02

(58) Field of Classification Search ............. 369/112.21, 369/94
See application file for complete search history.

(56) References Cited

U.S. PATENT DOCUMENTS

| 6,108,139 | A | 8/2000 | Takahashi |
| 6,791,934 | B2 | 9/2004 | Shimano et al. |
| 7,245,574 | B2 | 7/2007 | Kamisada et al. |
| 7,342,867 | B2 * | 3/2008 | Ito et al. ............ 369/112.01 |
| 7,656,775 | B2 * | 2/2010 | Mori et al. ............ 369/116 |
| 2004/0085885 | A1 | 5/2004 | Kikuchi et al. |
| 2004/0114494 | A1 | 6/2004 | Mizuno et al. |

(Continued)

FOREIGN PATENT DOCUMENTS

CN    1499502    5/2004

(Continued)

OTHER PUBLICATIONS

"Optical Disk Technology, the second edition," pp. 60-62, published Feb. 10, 1988, by Radio Technology (with partial English translation).

(Continued)

*Primary Examiner* — Wayne R Young
*Assistant Examiner* — Dionne H Pendleton

(57) ABSTRACT

An optical head that is restrained from becoming larger, even if it is used for an optical-information recording medium that includes a plurality of information recording layers. In this optical head, a collimating lens is formed by a concave lens disposed on the side of a light source and a convex lens disposed on the side of an objective lens. A collimating-lens actuator moves the convex lens in a direction where a spherical aberration is cancelled which is generated according to the thickness of a light transmission layer up to an information recording layer of the optical-information recording medium. An aperture stop is provided on the side of the collimating lens with respect to the objective lens, and the aperture stop is located near the focal position of the convex lens on the side of the objective lens.

6 Claims, 9 Drawing Sheets

U.S. PATENT DOCUMENTS

| | | |
|---|---|---|
| 2004/0213131 A1 | 10/2004 | Kimura et al. |
| 2005/0018585 A1 | 1/2005 | Itonaga |
| 2005/0174920 A1 | 8/2005 | Ito et al. |
| 2006/0203302 A1 | 9/2006 | Hendriks et al. |

FOREIGN PATENT DOCUMENTS

| | | |
|---|---|---|
| JP | 4082032 | 3/1992 |
| JP | 11-259906 | 9/1999 |
| JP | 2003-006909 | 1/2003 |
| JP | 2003/099942 | 4/2003 |
| JP | 2003-114380 | 4/2003 |
| JP | 2004/171682 | 6/2004 |
| JP | 2007-503664 | 2/2007 |

OTHER PUBLICATIONS

Chinese Office Action (with partial English translation) issued May 30, 2008 in Chinese Patent Application No. 200510120197.3.

MAT (machine assisted translation) of JP 2004/171682—all pages, no figures.

Office Action dated Feb. 23, 2010 issued in corresponding Japanese Patent Application No. 2005-311397 with English translation.

Office Action mailed Nov. 16, 2010 issued in corresponding Japanese Application No. 2005-311397 with English translation.

* cited by examiner

OPTICAL HEAD, AND INFORMATION RECORDING-AND-REGENERATION APPARATUS

The present application is a divisional of U.S. application Ser. No. 11/272,822, filed Nov. 15, 2005, patented as U.S. Pat. No. 7,656,775 on Feb. 2, 2010.

BACKGROUND OF THE INVENTION

1. Field of the Invention

The present invention relates to an optical head, and an information recording-and-regeneration apparatus which includes the optical head.

2. Description of the Related Art

Among optical-information recording mediums with high density and a large capacity on the market, there is an optical disk called a DVD or a BD. Such an optical disk has been increasingly popular as a recording medium for recording an image, music or computer data.

As the capacity of an optical disk has become larger, the wavelength of an optical-head light source has become shorter. The numerical aperture of an objective lens has also become wider. However, the wider such an NA becomes, the more conspicuously a spherical aberration varies according to a change in the thickness of a light transmission layer in an optical disk. For example, in the case where the wavelength used in a DVD is 650 nm and its objective lens has an NA of 0.6, if the thickness of a light transmission layer is changed by 10 μm, a spherical aberration of approximately 10 m λ is produced. In contrast, a wavelength of 400 nm and an NA of 0.85 will be used for a next-generation optical disk. In that case, with respect to a change by 10 μm in a light-transmission layer thickness, a spherical aberration of about 100 m λ is produced. This is around ten times as long as that of a DVD.

As a means for correcting a spherical aberration, a system is described in Japanese Patent Laid-Open No. 11-259906 specification. A collimating lens is mounted in a collimating-lens actuator, and the collimating lens which is placed between a light source and an objective lens is moved. In this system, the collimating lens is moved, so that a spherical aberration which is caused by an error in the thickness of a light transmission layer can be cancelled. This will be specifically described below with reference to FIG. 9.

FIG. 9 shows the configuration of an optical head 101 which is disclosed in the above described specification. This optical head 101 includes: a light source 110; a diffraction grating 111; a polarization beam splitter 112; a collimating lens 113; a collimating-lens actuator 114; a quarter-wave plate 115; an objective lens 116; an objective-lens biaxial actuator 117; a multi-lens 118; and a photo-detector 119.

A beam of light, which is emitted from the light source 110, is first incident upon the diffraction grating 111. Then, it is diffracted by this diffraction grating 111. This diffraction grating 111 is used to split the beam of light at least into three, so that tracking servo control can be executed by a so-called three-spot method.

Then, a zero-order beam and a ±first-order beam (hereinafter, referred to, together, as the "incident beam of light") which are formed after the beam of light has been diffracted by the diffraction grating 111 transmit the polarization beam splitter 112. Sequentially, they are incident upon the collimating lens 113. Herein, the collimating lens 113 is formed, for example, by getting two spherical lenses 113a, 113b to adhere to each other.

The beam of light, which is incident upon the collimating lens 113, turns into a parallel beam through the collimating lens 113. This is realized in the case where the thickness t of a light transmission layer 104 of an optical disk 102 is equal to a predetermined value.

Herein, this collimating lens 113 is mounted on the collimating-lens actuator 114. Thus, it can be moved back and forth along the optical axis of the incident beam of light by the collimating-lens actuator 114. Unless the light-transmission thickness t of the optical disk 102 is equal to a predetermined value, the collimating lens 113 is moved by the collimating-lens actuator 114 so that the spherical aberration which is caused by the thickness error of the light transmission layer 104 can be corrected. In other words, if the thickness t of the light transmission layer 104 of the optical disk 102 is not a predetermined value, the incident beam of light is transformed into a divergent beam or a convergent beam by the collimating lens 113, so that the spherical aberration caused by the thickness error of the light transmission layer 104 can be corrected.

Then, the incident beam of light, which is emitted from the collimating lens 113, is incident through the quarter-wave plate 115 upon the objective lens 116. Herein, when passing through the quarter-wave plate 115, the incident beam of light comes into a circularly-polarized light state. This circularly-polarized luminous flux is incident upon the objective lens 116.

The objective lens 116 is used to concentrate the incident beam of light on the recording layer of the optical disk 102. Specifically, the incident beam of light in the circularly-polarized light state through the quarter-wave plate 115 is collected by the objective lens 116. Then, it passes through the light transmission layer 104 of the optical disk 102 and is incident upon the recording layer of the optical disk 102.

The incident beam of light which is collected by the objective lens 116 and is incident upon the recording layer of the optical disk 102 is reflected by the recording layer. Thereby, it becomes a return beam. This return beam traces the former optical path and passes through the objective lens 116. Thereafter, it is incident on the quarter-wave plate 115. Then, the return beam transmits the quarter-wave plate 115, so that it becomes a linearly-polarized beam which is turned by an angle of 90 degrees to the polarization direction before the return. After this, the return beam is transformed into a convergent beam by the collimating lens 113. Thereafter, it is incident on the polarization beam splitter 112 and is reflected by this polarization beam splitter 112. The return beam, which is reflected by the polarization beam splitter 112, passes through the multi-lens 118 and is incident on the photo-detector 119. Then, it is detected by this photo-detector 119.

Using the above described optical head 101, recording and regeneration are conducted by concentrating a beam of light on the recording layer of the Optical disk 102. At that time, an aberration can be produced by an error in the thickness of the light transmission layer 104 in the optical disk 102. Such an aberration is mainly caused by a defocus and a spherical aberration.

A defocus is corrected by focus servo control. Specifically, focus servo control is executed based on the quantity of light which is detected in the photo-detector 119. Then, the objective lens 116 is moved forward and backward in the optical-axis directions by the objective-lens biaxial actuator 117. Thereby, a defocus is corrected so that the focus is adjusted onto the recording layer.

On the other hand, in terms of a spherical aberration, the incident beam of light which is incident upon the objective lens 116 is transformed into a divergent beam or a convergent beam. Thereby, a spherical aberration is generated which has an inverse polarity to a spherical aberration that is produced according to the thickness t of the light transmission layer 104. As a result, a correction can be made. Specifically, using the collimating-lens actuator 114, the collimating lens 113 is moved back and forth in the optical-axis directions. Thereby, the incident beam of light upon the objective lens 116 is transformed into a divergent beam or a convergent beam. Then, an inverse-polarity spherical aberration is generated by the objective lens 116. This makes it possible to cancel a spherical aberration which is caused by an error in the thickness of the light transmission layer 104. In other words, in this optical head 101, the collimating-lens actuator 114 works as a moving means for moving the collimating lens 113, so that a spherical aberration can be cancelled according to the thickness t of the light transmission layer 104 in the optical disk 102. Therefore, in this optical head 101, when a beam of light which is emitted from the light source 110 transmits the objective lens 116 to form a focal point, a spherical aberration remains cancelled. Hence, as the whole optical system, a spherical aberration is desirably corrected.

In order to realize a larger capacity in the future, it can be considered that the number of information recording layers should be increased. In other words, if more information recording layers are used to record information on each information recording layer, their capacity becomes larger. However, each information recording layer is located at a different distance from an objective lens. Hence, a spherical aberration to be generated is supposed to differ for each information recording layer. Specifically, let's assume that a residual spherical aberration of a beam of light, which reaches a certain information recording layer, is set to be at the minimum. At this time, the thickness of a light transmission layer is called an optimum material thickness. In this case, for an information recording layer different from this information recording layer, a spherical aberration is generated according to the length at which the thickness of a light transmission layer varies from the optimum material thickness. Herein, if a variation in the thickness of a light transmission layer is Δd, the refractive index of the light transmission layer is n and the numerical aperture of an objective lens is NA, then a third-order spherical aberration W is expressed by the following numerical formula (2) (Refer to pp. 60—in the second edition of optical disk technology by Radio Technology Co.).

$$W = \frac{n^3 - 1}{8n^3}(NA)^4 \Delta d \quad (2)$$

As is obvious from this numerical formula (2), the third-order spherical aberration W lengthens in proportion to the variation Δd in the light transmission layer's thickness from the optimum material thickness. In other words, the greater the thickness of a light transmission layer becomes by multi-layering an information recording layer, the greater spherical aberration can be corrected. Therefore, in a conventional optical head, the movement distance of a collimating lens required to correct a produced spherical aberration also lengthens. As a result, in order to secure such a distance by which the collimating lens moves, a collimating-lens actuator needs to be larger. This presents a disadvantage in that the optical head becomes larger.

BRIEF DISCLOSURE OF THE INVENTION

In view of the above described disadvantage, it is an object of the present invention to provide an optical head which can be restrained from becoming larger, even if it is used for an optical-information recording medium that includes a plurality of information recording layers.

In order to attain the above described object, an optical head according to the present invention which concentrates a light beam that is emitted from a light source, through a collimating lens and an objective lens, upon an optical-information recording medium that includes a plurality of information recording layers, wherein: the collimating lens is formed by a concave lens which is disposed on the side of the light source and a convex lens which is disposed on the side of the objective lens; and a collimating-lens actuator is provided which moves the convex lens in a direction where a spherical aberration generated according to the thickness of a light transmission layer up to an information recording layer of the optical-information recording medium is cancelled.

According to the present invention, the collimating-lens actuator moves the convex lens, so that a light beam, which is incident on the objective lens, can be transformed from a parallel beam into a divergent beam or a convergent beam. This makes it possible to make smaller a spherical aberration which is generated according to the thickness of the light transmission layer up to an information recording layer inside of the optical-information recording medium. Besides, the collimating lens is formed by the concave lens and the convex lens. Thereby, the focal length of the convex lens is shorter than the focal length as the collimating lens. This helps secure a function as the collimating lens. Simultaneously, compared with the case where a collimating lens is formed by a single lens, it helps shorten the above described movement distance of the convex lens when a spherical aberration is corrected. Consequently, the range, within which the convex lens moves, narrows, so that an optical head which is used for an optical-information recording medium including several information recording layers can be kept from becoming larger.

As described so far, according to the present invention, an optical head can be prevented from becoming larger, even if it is used for an optical-information recording medium provided with a plurality of information recording layers.

These and other objects, features and advantages of the present invention will become more apparent upon reading of the following detailed description along with the accompanied drawings.

DETAILED DESCRIPTION OF THE INVENTION

Hereinafter, the most desirable embodiments for implementing the present invention will be described in detail with reference to the drawings.

First Embodiment

Figure 1:
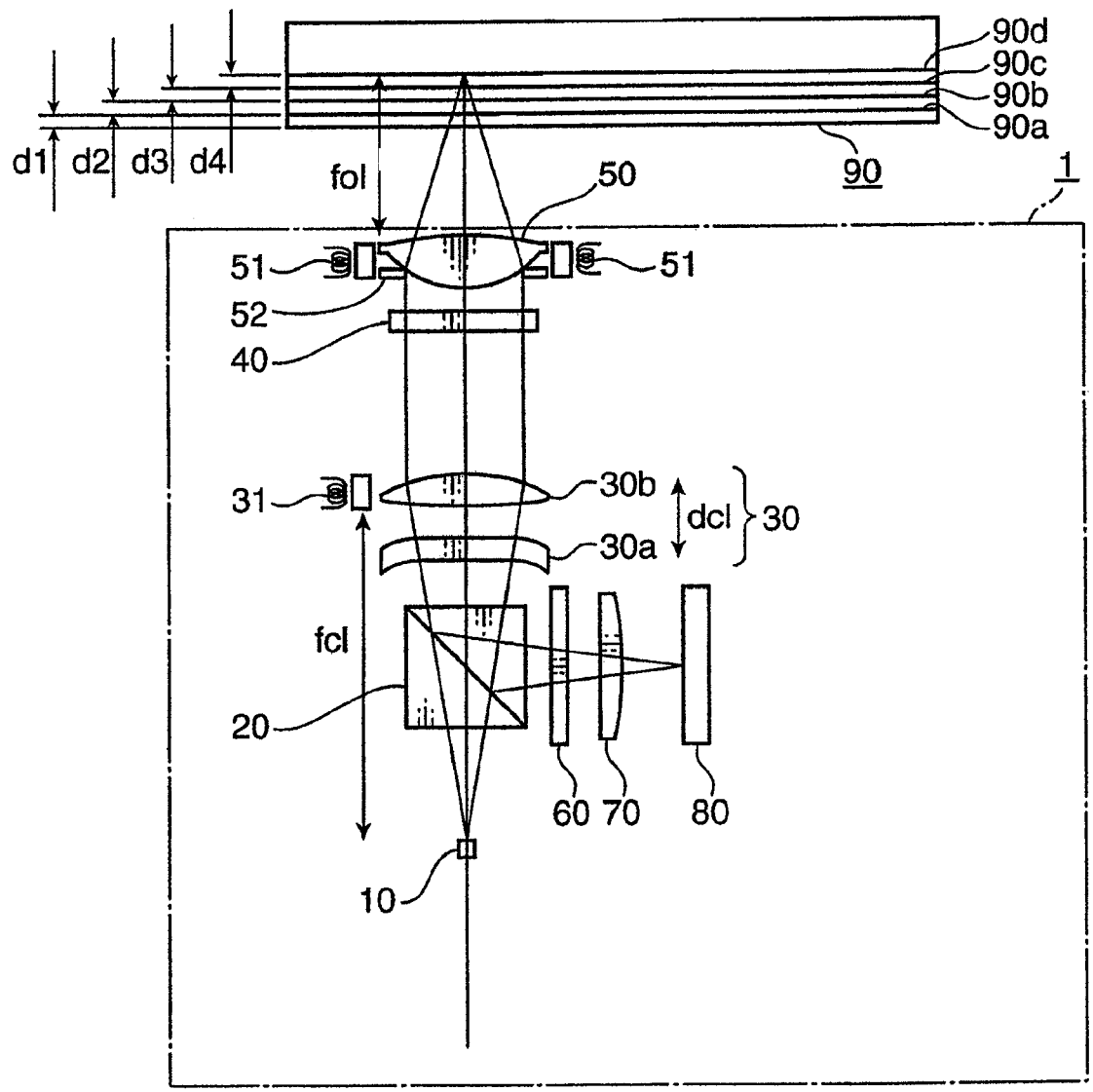
FIG. 1 is a schematic view of an optical head according to a first embodiment of the present invention, showing its configuration.

FIG. 1 is a schematic view of an optical head according to a first embodiment of the present invention. This optical head 1 irradiates an optical-information recording medium 90, such as an optical disk, with a light beam.

This optical head 1 includes: a light source 10; a polarization beam splitter 20; a collimating lens 30; a collimating-lens actuator 31; a quarter-wave plate 40; an objective lens 50; an objective-lens actuator 51; an objective-lens aperture diaphragm 52; a diffraction grating 60; a cylindrical lens 70; and a photo-detector 80.

The above described optical-information recording medium 90 includes a plurality of (e.g., four in the figure) information recording layers 90a, . . . , 90d. Between its surface on the side of the objective lens 50 and the information recording layer 90a on the incidence-nearest side which is closest to this surface on the incidence side, a light transmission layer lies which has a thickness of d1. Another light transmission layer whose thickness is d2 is disposed between the information recording layer 90a on the incidence-nearest side and the information recording layer (i.e., the second information recording layer) 90b which is adjacent to this information recording layer 90a. Still another light transmission layer sits between the second information recording layer 90b and the third information recording layer 90c. It has a thickness of d3. Finally, between the third information recording layer 90c and the fourth information recording layer (i.e., the information recording layer on the deepest side) 90d, a light transmission layer whose thickness is d4 lies.

The above described light source 10 is used to emit a light beam toward the optical-information recording medium 90 at the time of recording and regeneration. It emits a linearly-polarized divergent beam. The divergent beam, which is emitted from the light source 10, passes through the polarization beam splitter 20 and is incident on the collimating lens 30. Herein, different from the optical head according to the prior art, the collimating lens 30 is formed by two independent positive-power lens and negative-power lens. Specifically, the collimating lens 30 is formed by a negative-power concave lens 30a, which is disposed on the side of the light source 10, and a positive-power convex lens 30b, which is disposed on the side of the objective lens 50. The concave lens 30a is a meniscus lens whose beam-incidence surface is concave and whose beam-emission surface is convex. In the convex lens 30b, both surfaces are convex in the figure. However, instead of this, one surface may also be a convex lens which is shaped like a plane. If its performance is taken into account, preferably, both surfaces should be a convex lens which has a convex shape.

Figure 2:
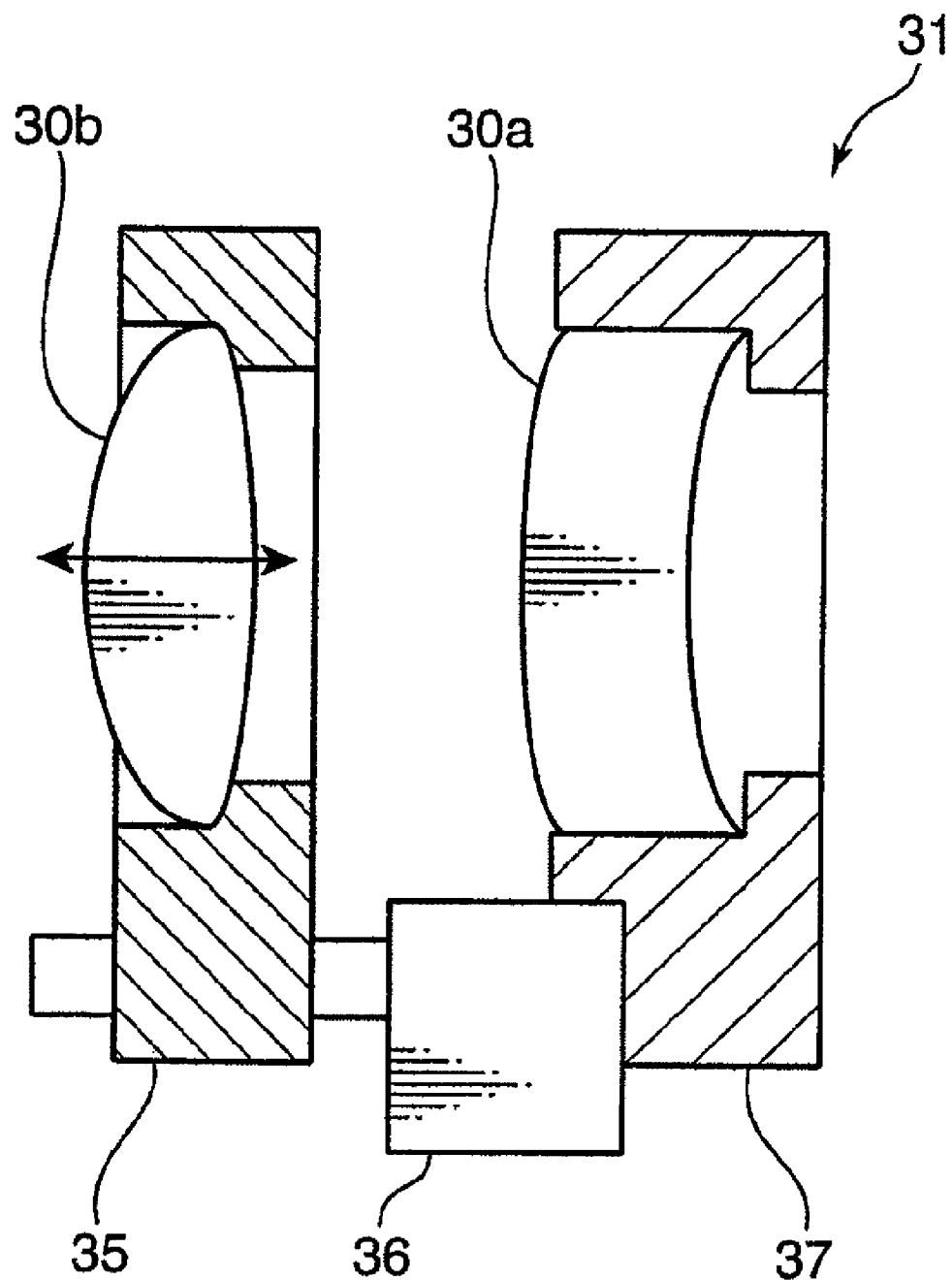
FIG. 2 is a schematic view of a collimating-lens actuator provided in the optical head, showing its configuration.

The convex lens 30b is mounted in the collimating-lens actuator 31. The collimating-lens actuator 31 includes, as shown in FIG. 2, a fixed lens holder 37, a drive portion 36, which is fixed on this fixed lens holder 37, a movable lens holder 35 which can be moved by this drive portion 36. On the fixed lens holder 37, the concave lens 30a is fixed, and the convex lens 30b is fixed on the movable lens holder 35. The movable lens holder 35 can be moved, by the drive portion 36, in both directions (i.e., front-and-back directions) along the optical axis of a beam of light. The drive portion 36 may also transfer the movable lens holder 35, for example, by allowing a stepping motor to revolve a screw shaft. Or, it may also transfer the movable lens holder 35, for example, by allowing a piezo-electric element to move the shaft itself in the shaft directions.

The convex lens 30b is ordinarily set in a reference position. When the convex lens 30b is in this reference position, the light beam which goes toward the objective lens 50 from the collimating lens 30 becomes a parallel beam. If the distance dcl between the convex lens 30b and the concave lens 30a is varied by moving the movable lens holder 35, the light beam which is emitted from the collimating lens 30 turns, from the parallel beam, into a divergent beam or a convergent beam. This distance dcl between the convex lens 30b and the concave lens 30a is adjusted, so that a spherical aberration can be corrected which is generated according to the thickness of the light transmission layer up to the information recording layers 90a, . . . , 90d where recording and regeneration are conducted. Specifically, the beam of light incident upon the objective lens 50 is transformed into a divergent beam or a convergent beam. Thereby, a spherical aberration which has an inverse polarity is generated by the objective lens 50. This helps make smaller a spherical aberration which is produced according to the thickness of the light transmission layer. In other words, in this embodiment, the collimating lens 30 which is made up of the concave lens 30a and the convex lens 30b, and the collimating-lens actuator 31, configures an aberration correcting means for correcting a spherical aberration which is produced according to the thickness of the light transmission layer.

The incident beam of light which transmits the collimating lens 30 is incident through the quarter-wave plate 40 upon the objective lens 50. Herein, when passing through the quarter-wave plate 40, the incident beam of light comes into a circularly-polarized light state. This circularly-polarized luminous flux is incident upon the objective lens 50. The above described objective-lens aperture stop 52 is placed on the incidence side (i.e., collimating-lens side) of the objective lens 50. This objective-lens aperture stop 52 restricts the diameter of the beam of light incident upon the objective lens 50. The objective-lens aperture stop 52 is disposed in the vicinity of the focal position of the convex lens 30b. This disposition makes it possible to restrain a variation in the quantity of the incident beam of light which can pass through the objective-lens aperture stop 52, even if the incident beam of light is transformed into a divergent beam or a convergent beam by moving the convex lens 30b in the optical-axis directions so that a spherical aberration can be corrected. Herein, the vicinity of the focal position of the convex lens 30b includes the range from the focal position of the convex lens 30b up to the positions which are ±20% of its focal length away. Preferably, it should be below ±10% of the convex lens 30b's focal length. If this range is used, the quantity of the incident beam of light can be kept from varying, so the recording-and-regeneration capability cannot be affected so much.

The objective lens 50 is used to concentrate the incident beam of light on the information recording layer of the optical-information recording medium 90. Specifically, the incident beam of light in the circularly-polarized light state through the quarter-wave plate 40 is collected by the objective lens 50. Then, it passes through the light transmission layer of the optical-information recording medium 90 and is incident upon the targeted information recording layers 90a, . . . , 90d.

The incident beam of light which is collected upon the information recording layers 90a, . . . , 90d is reflected by the information recording layers 90a, . . . , 90d. Thereby, it becomes a return beam. This return beam traces the former optical path and passes through the objective lens 50. Thereafter, it is incident on the quarter-wave plate 40. Then, the return beam transmits the quarter-wave plate 40, so that it becomes a linearly-polarized beam which is turned by an angle of 90 degrees to the polarization direction before the return. After this, the return beam is transformed into a convergent beam by the collimating lens 30. Thereafter, it is reflected by this polarization beam splitter 20.

The return beam which is reflected by the polarization beam splitter 20 is split into a zero-order beam and a first-order beam by the diffraction grating 60 which is a beam-splitting element. Then, it passes through the cylindrical lens 70 and is incident on the photo-detector 80. Then, it is detected by this photo-detector 80. This cylindrical lens 70 is used to give the return beam astigmatism for allowing of focus servo control by a so-called astigmatic method. The photo-detector 80 outputs an electric signal according to the intensity of the return beam which is incident on each photo-diode. Besides, it executes a predetermined arithmetic processing for the electric signal. Then, it generates and outputs a signal, such as a focus servo signal and a tracking servo signal.

Herein, in this first embodiment, as an example, specific numerical values are shown below.

The wavelength of a beam of light which is emitted from the light source 10: $\lambda=405$ nm.

The synthetic focal length of the collimating lens 30: fcl=18.8 mm.

The focal length of the concave lens 30a: fcl-concave=−21 mm.

The focal length of the convex lens 30b: fcl-convex=12 mm.

The lens distance between the concave lens 30a and the convex lens 30b: dcl=3.0 mm.

The focal length of the objective lens 50: fol=1.3 mm.

The objective-lens aperture stop 52: $\phi=2.21$ mm.

The thickness of each light transmission layer between information recording layers: d1=d2=d3=d4=25 μm.

The refractive index of each light transmission layer of the information recording medium 90: n1=n2=n3=n4=1.61.

Figure 3:
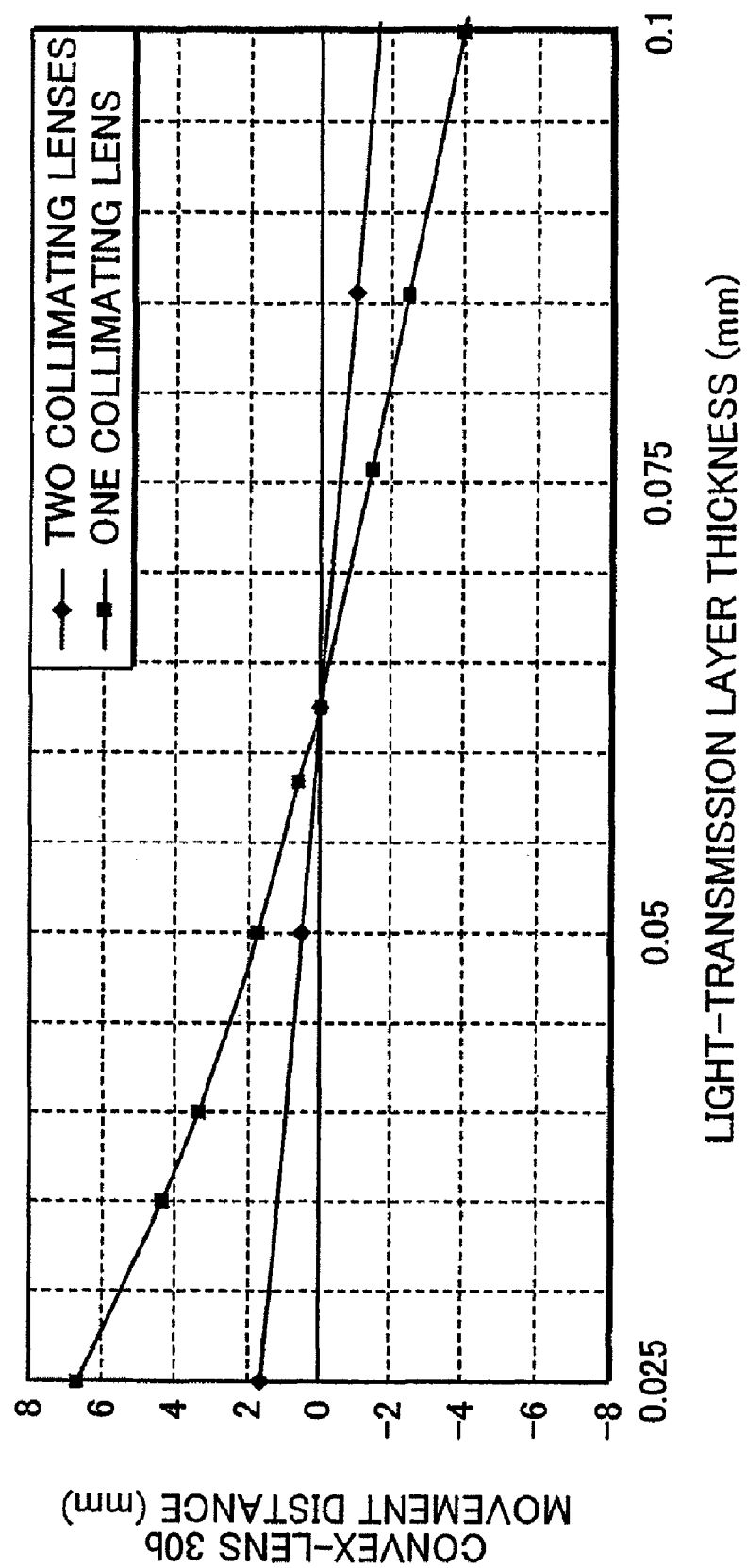
FIG. 3 is a graphical representation, showing a characteristic correlation between the thickness of a light transmission layer and the movement distance of a convex lens.

In the case of the above described example of specific numerical values, FIG. 3 shows the correlation between the movement distance of the convex lens 30b and the light-transmission layer thickness. In this figure, the vertical axis indicates the distance (mm) by which the convex lens 30b moves, and the horizontal axis indicates the thickness of a light transmission layer (mm). It shows the movement distance of the convex lens 30b which is required to correct a spherical aberration that is generated when a light beam is concentrated on the information recording layers 90a, . . . , 90d of the information recording medium 90. In terms of the horizontal axis, 0.025 mm corresponds to the position of the information recording layer 90a on the incidence-nearest side, and 0.1 mm corresponds to the position of the information recording layer 90d on the deepest side.

The movement distance of the convex lens 30b is set to a zero point when a light beam which passes through the collimating lens 30 becomes a parallel beam. In this example, it is the time when the lens distance dcl between the concave lens 30a and the convex lens 30b is equal to 3.0 mm. At this time, the objective lens 50 is selected so that a residual spherical aberration comes to the minimum when a light beam is collected by the objective lens 50 and its focal point coincides with the position which is 62.5 μm (0.0625 mm) away from the surface of the information recording medium 90. In short, the objective lens 50 is used, as a condition, so that a spherical aberration becomes the minimum at a light-transmission layer thickness of 62.5 μm. In the same figure, as the lens distance dcl becomes longer, the movement distance in that direction is set as "+". Then, a comparison is made between the case where the collimating lens 30 is formed by the convex lens 30b and the concave lens 30a, as described in this embodiment, and the case where a collimating lens is formed by a single convex lens, as in the prior art. These collimating lenses are designed so as to have the same focal length fcl of 18.8 mm.

As can be seen from FIG. 3, in order to correct a spherical aberration within the range of the thickness d1~d4 of each light transmission layer of the information recording medium 90, a movement distance of approximately 10.5 mm is necessary in the case of a single convex lens. In contrast, in the case of the collimating lens 30 according to this embodiment, it is enough that the movement distance is about 4.0 mm. Therefore, in this embodiment, the distance by which the convex lens 30b is moved in the optical-axis directions can be shortened.

Figure 4:
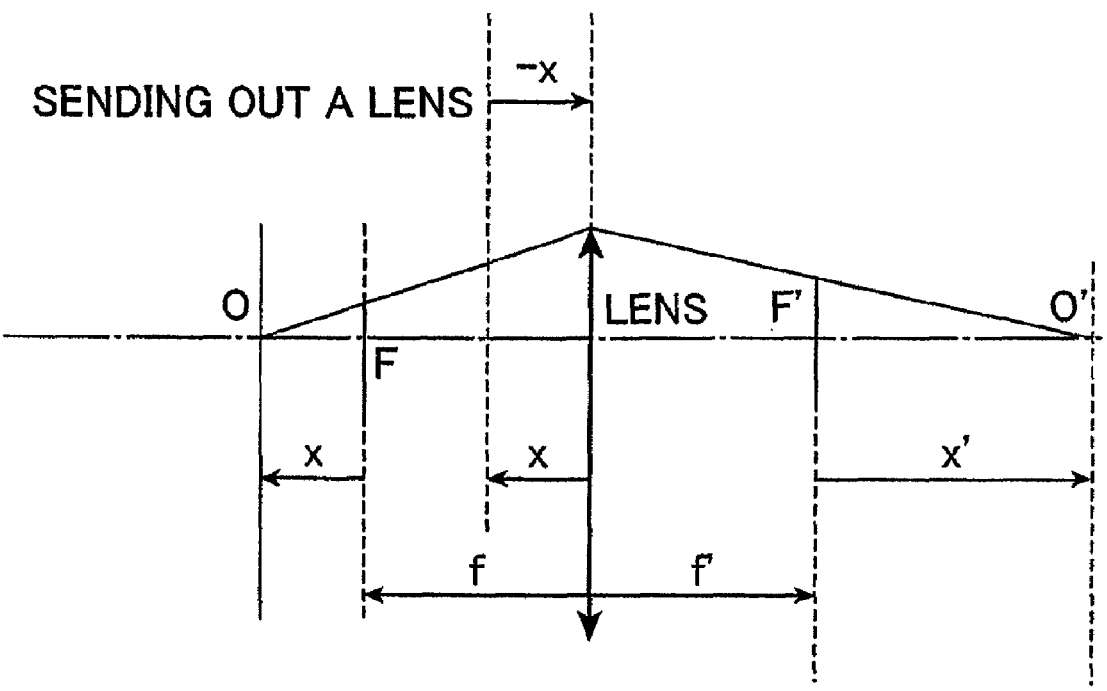
FIG. 4 is an illustration, showing a correlation between an object distance and a lens movement distance.

Why this result can be obtained? With reference to a correlation between an object distance and a lens movement distance shown in FIG. 4, the reason will be described using the following Newton's image-formation formula.

$$xx'=ff'=-f^2=-f'^2 \qquad (3)$$

A beam of light which is emitted from the position O of a light source is concentrated by a lens and forms an image in the position O' of a light-source virtual image. In the case where the lens moves by a distance x, a correlation is calculated between: the distance x' between a focal point F' of the lens on the rear side and the light-source virtual image O'; and the lens movement distance x. If the lens moves by the distance x, then using the formula (3), the position O' of the light-source virtual image varies in proportion to the square of a focal distance f. Therefore, if a collimating lens is formed by two independent lenses and the focal distance f of the convex lens 30b to be moved is shortened, then the light-source virtual-image position O' can be largely moved with a shorter lens-movement distance. In other words, the focal position fcl-convex of the convex lens 30b is shorter than the focal distance in the case of one collimating lens. Hence, even if it moves by a shorter distance than the single collimating lens, the beam of light incident upon the objective lens 50 can be brought to the same divergent state or convergent state as the single collimating lens. Herein, the focal position of the convex lens 30b can be most suitably determined according to various elements, such as a magnification in the optical system of the optical head, the relation between the focal position of the collimating lens 30 and the concave lens 30a with a negative power which forms the collimating lens 30, and the external shape of the optical head.

Figure 5:
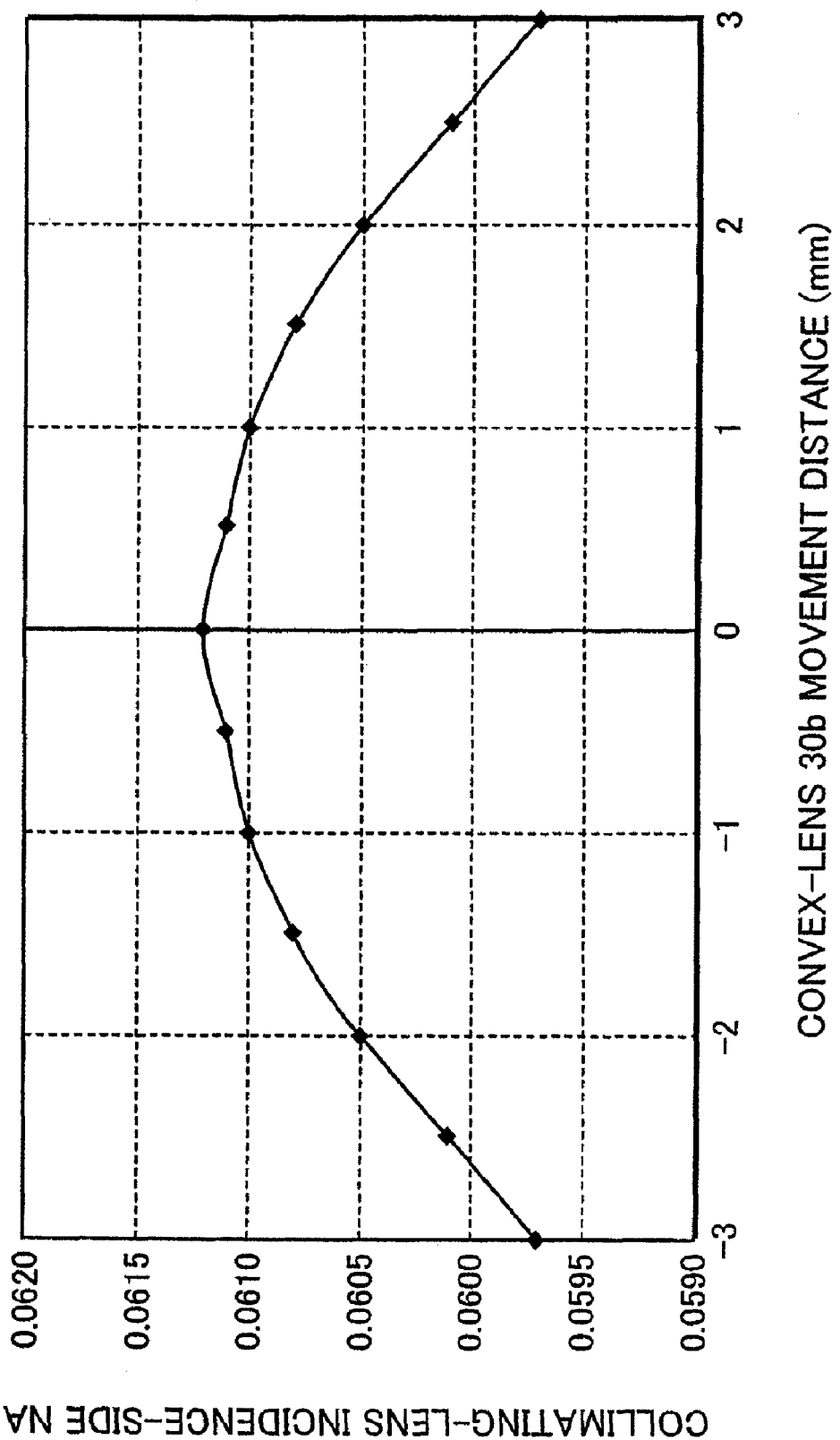
FIG. 5 is a graphical representation, showing a characteristic correlation between the movement distance of the convex lens and the NA of a collimating lens on the incidence side.

FIG. 5 shows a variation in the NA of a collimating lens on the incidence side with respect to the movement distance of the convex lens 30b in this optical head 1. In the figure, the vertical axis indicates the collimating-lens incidence-side NA and the horizontal axis indicates the distance by which the convex lens 30b moves. Herein, the collimating-lens incidence-side NA means how greatly an incident luminous flux upon the collimating lens 30 is widened on the light-source side in the case where an incident beam flux is restricted by the objective-lens aperture stop 52.

At the origin where the movement distance of the convex lens 30b is zero, the beam of light which is emitted from the collimating lens 30 becomes a parallel beam. In this embodiment, the lens distance dcl between the concave lens 30a and the convex lens 30b is equal to 3.0 mm. When the convex lens 30b is at the origin, the focal position of the convex lens 30b on the objective-lens side is set to be coincident with the position of the objective-lens aperture stop 52. In terms of the movement distance of the convex lens 30b, the direction in which the lens interval becomes wider is set as "+".

As the convex lens 30b moves, the collimating-lens incidence-side NA varies. It peaks when the convex lens 30b comes to the origin and curves convexly on the upper side. Therefore, if the convex lens 30b is designed to move toward both sides with respect to the origin, the variation in the collimating-lens incidence-side NA comes to the minimum. Specifically, if the movement distance of the convex lens 30b is 4 mm (e.g., refer to the two collimating lenses in FIG. 3), in the case where the convex lens 30b moves within the range from −2 mm to +2 mm, then the collimating-lens incidence-side NA can be varied less than in the case where the convex lens 30b moves within the range from −3 mm to +1 mm. Hence, in the case where the objective-lens aperture stop 52 is disposed near the focal position of the convex lens 30b, even if the convex lens 30b moves so that a spherical aberration can be corrected, the collimating-lens incidence-side NA can be restrained from varying. Therefore, the variation in the quantity of a beam of light incident on the objective-lens aperture stop 52 can be kept at the minimum. This makes it possible to stabilize the quantity of a beam of light incident upon the optical-information recording medium 90. As a result, whichever of the information recording layers 90a, . . . , 90d is in focus, the quantity of a beam of light incident upon the optical-information recording medium 90 and the light quantity of a recording-and-regeneration signal based on a return beam from the optical-information recording medium 90, can be stabilized.

As described so far, in this embodiment, even if the movement distance of a lens is shorter, an amount of a spherical-aberration correction becomes greater. In addition, the movement of a lens can be restrained from varying the efficiency at which an incident beam of light enters the objective lens 50. Therefore, in the optical system, the distance by which a movement portion makes a motion can be shortened. This helps make the optical head 1 smaller. Furthermore, an optical-axis shift which may be caused when the convex lens 30b moves can be kept from generating a spherical aberration. This contributes toward enhancing the performance of recording and regeneration.

Herein, in this embodiment, an optical-information recording medium is provided with four information recording layers. However, the present invention is not limited to this. Similar advantages can be obtained, as long as several such layers, for example, three or eight, are used.

Moreover, in this first embodiment, as a specific numerical-value example, the case is mentioned in which the thickness of each light transmission layer between information recording layers is d1=d2=d3=d4=25 μm. However, the present invention is not limited to this. The thickness of each light transmission layer between information recording layers may also be, for example, d1=55 μm, d2=10 μm, d3=20 μm, d4=15 μm. Or, they may also be d1=60 μm, d2=10 μm, d3=20 μm, d4=15 μm.

Herein, characteristics of this embodiment will be described.

(1) An aperture stop is provided on the collimating-lens side of the objective lens. This aperture stop is disposed near the focal position of the convex lens on the side of the objective lens. Therefore, even if the convex lens moves so that a spherical aberration can be corrected, the variation in the quantity of a beam of light incident on the aperture stop can be kept at the minimum. This makes it possible to stabilize the quantity of a beam of light incident upon an optical-information recording medium.

(2) The objective lens is set so that the absolute value of a spherical aberration, which is generated when the focal point of the objective lens upon which a parallel beam is incident coincides with the information recording layer of the optical-information recording medium which is closest to its surface on the incidence side, is equal to the absolute value of a spherical aberration which is generated when the focal point coincides with the information recording layer on the deepest side. Therefore, the absolute value of a spherical aberration when the focal point of the objective lens meets the information recording layer which is closest to the incidence-side surface is equivalent to the absolute value of a spherical aberration when the focal point of the objective lens meets the information recording layer on the deepest side. Therefore, when these spherical aberrations are corrected, the percentage at which the light beam which is incident on the objective lens is transformed from a parallel beam to a divergent beam can be equated to the percentage at which it is transformed from a parallel beam to a convergent beam. This makes it possible to equate a change in the quantity of light when a divergent beam is incident upon the objective lens and a change in the quantity of light when a convergent beam is incident. Hence, the capability to record and regenerate information can be easily secured in any information recording layers.

(3) If (i) the thickness of the light transmission layer up to the j-th (herein, j is an integer of $1 \leq j \leq m$ and m is the number of information recording layers) information recording layer from the side upon which the light beam is incident is $d_j$, (ii) the refractive index of the j-th light transmission layer is $n_j$, (iii) the refractive index of the light transmission layer at the time when the objective lens is designed is N, and (iv) the thickness of the light transmission layer is A at which a spherical aberration generated by the objective lens on which a parallel beam is incident is offset in a state where the focal point of the objective lens is coincident between the information recording layer which is closest to the incidence-side surface and the information recording layer on the deepest side, then the objective lens satisfies the following formula (1).

$$\frac{N^2-1}{N^3} \cdot A \approx \left( \sum_{j=1}^{m} \frac{n_j^2-1}{n_j^3} \cdot d_j + \frac{n_1^2-1}{n_1^3} \cdot d_1 \right) / 2 \quad (1)$$

Therefore, a spherical aberration when the focal point of the objective lens comes to the information recording layer which is closest to the incidence-side surface can be easily equated to a spherical aberration when the focal point of the objective lens comes to the information recording layer on the deepest side.

Second Embodiment

Figure 6:
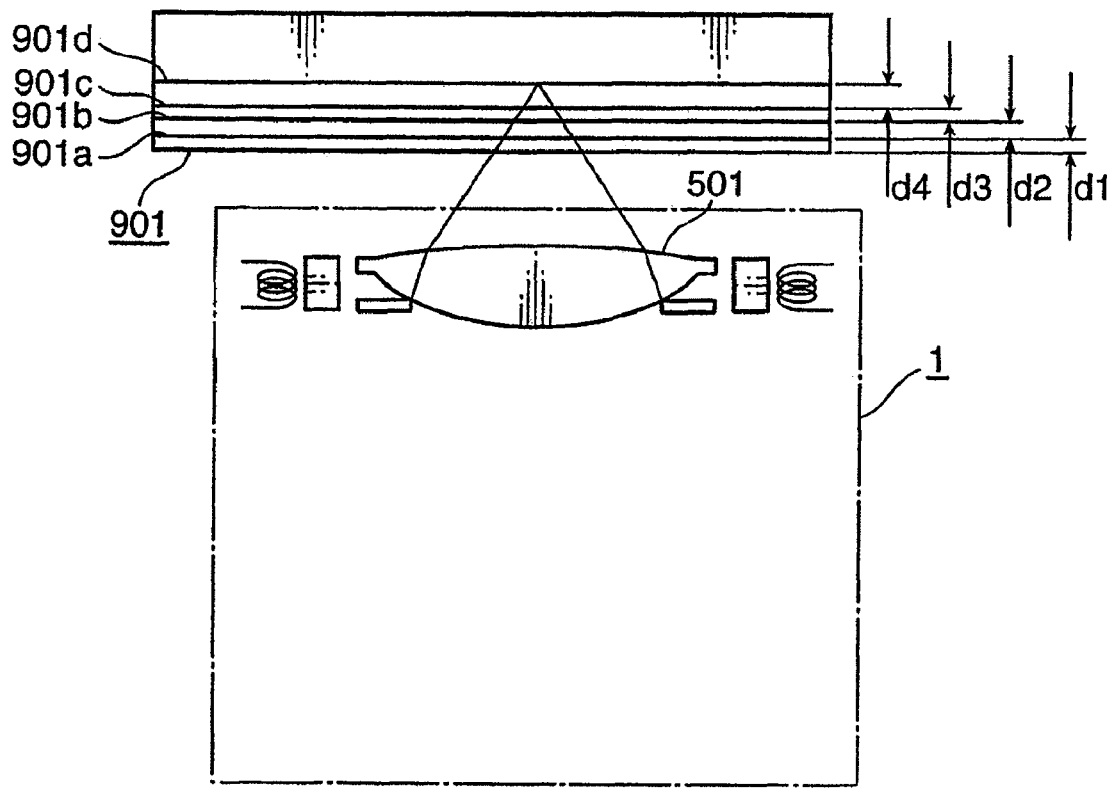
FIG. 6 is a schematic view of a part of an optical head and an optical-information recording medium according to a second embodiment of the present invention.

FIG. 6 is a schematic view of a part of an optical head 1 and an optical-information recording medium 901 according to a second embodiment of the present invention. Herein, in this second embodiment, the configuration except for an objective lens 501 is the same as in the above described first embodiment. Thus, only the different part will be described here.

In the optical-information recording medium 901, information recording layers 901a, 90 b, 901c, 901d are formed in this order from its surface on the side of the objective lens 501. The thickness of the light transmission layer is d1 from the surface of the optical-information recording medium 901 on the side of the objective lens 501 up to the information recording layer 901a on the incidence-nearest side. The thickness of the light transmission layer from the information recording layer 901a up to the second information recording layer 901b is d2. The thickness of the light transmission layer from the information recording layer 901b up to the third information recording layer 901c is d3. The thickness of the light transmission layer from the information recording layer 901c up to the fourth information recording layer (i.e., the deepest information recording layer) 901d is d4.

In terms of this optical-information recording medium 901, specific numerical values are shown below.

The thickness of each light transmission layer between information recording layers: d1=d2=d3=d4=25 μm.

The refractive index of each light transmission layer of the information recording medium 901: n1=n2=n3=n4=1.61. Herein, the numerical values other than the above-mentioned are the same as those in the first embodiment, and thus, their description is omitted.

As described in the first embodiment, a spherical aberration which varies according to the thickness of a light transmission layer can be corrected by transforming the beam of light which is emitted from the collimating lens 30 into a divergent beam or a convergent beam. Thereby, a third-order component which is the main component of the generated spherical aberration can be removed. This helps reduce the spherical aberration largely. However, in this case, a higher-order component (mainly, the fifth-order component) cannot be eliminated. In other words, in the case where an information recording layer in which recording and regeneration, are executed is changed, if the convex lens 30b is moved, then a third-order component can be removed, but a higher-order component cannot be eliminated.

Figure 7:
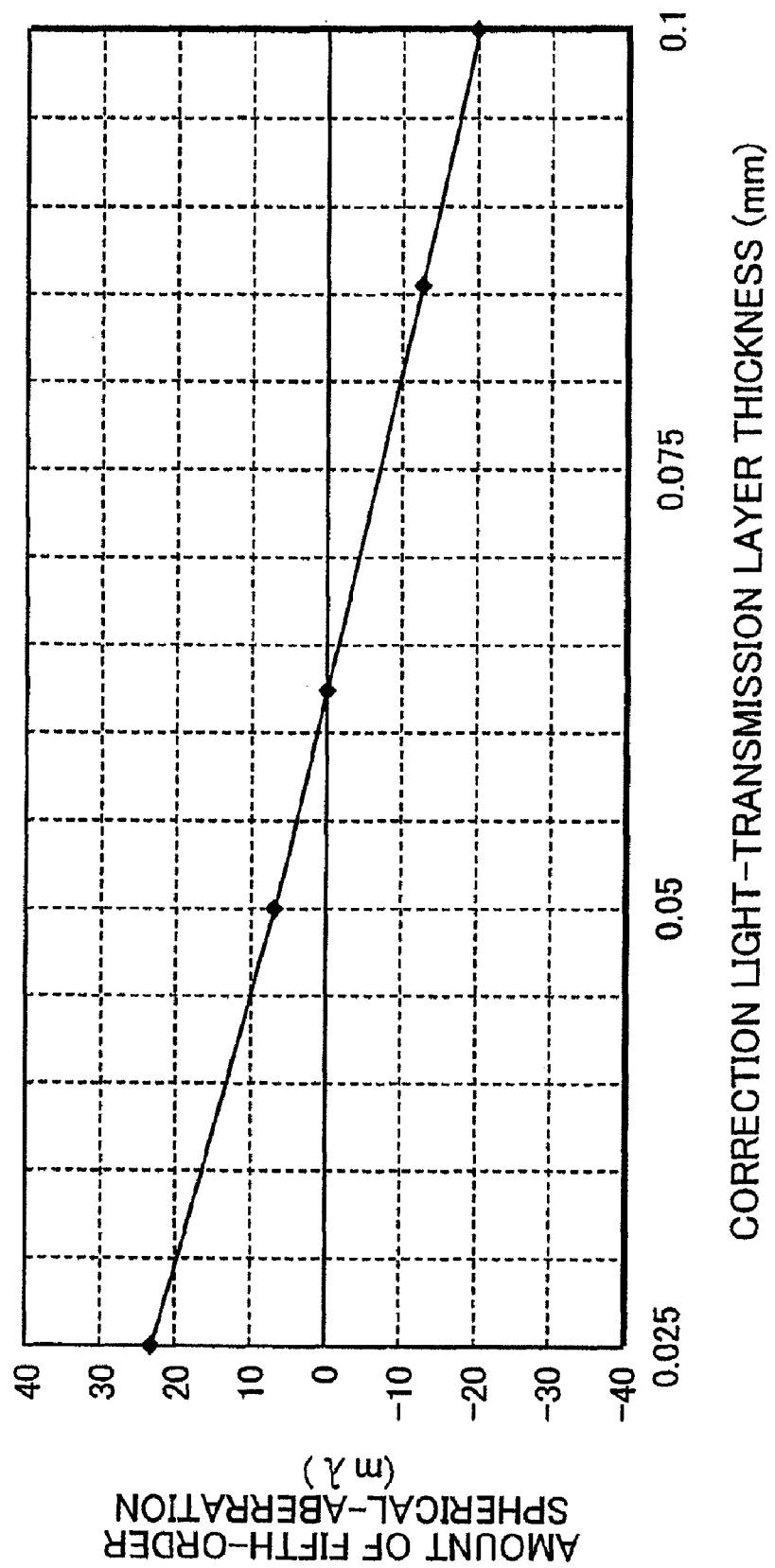
FIG. 7 is a graphical representation, showing a characteristic correlation between the thickness of a light transmission layer and the amount of a fifth-order spherical aberration to be generated.

FIG. 7 shows a correlation between the thickness of a light transmission layer and the amount of a fifth-order spherical aberration. This figure shows the correlation in the case where the optimum material thickness A of the objective lens 501 is 62.5 μm (herein, its design refractive index N is 1.61).

In the objective lens 501 according to this embodiment, in the air, a spherical aberration is designed to be generated which has an inverse polarity to a spherical aberration which is produced in a light transmission layer of the optical information recording medium 901. Besides, a spherical aberration which is given to the objective lens 501 is supposed to be offset by a light transmission layer which has a predetermined thickness.

Herein, the optimum material thickness A means the thickness of a light transmission layer at the time when the absolute value of a residual spherical aberration comes to the minimum in the case where a parallel beam is incident upon the objective lens 501 to form a focal point inside of an optical-information recording medium. Specifically, in terms of an objective lens, in the case where a parallel beam is incident, if the focal point is located at the information recording layer on the incidence-nearest side, then a spherical aberration is over-corrected. On the other hand, if the focal point coincides with the information recording layer on the deepest side, then a spherical aberration is under-corrected. Then, if the focal point comes to a middle-depth position between those, their spherical-aberration corrections are offset. In this sate, the thickness of a light transmission layer up to this middle-depth position is equivalent to the optimum material thickness A.

The amount of a spherical aberration to be generated is proportional to the thickness of a light transmission layer through which a beam of light passes. The closer it comes to the information recording layer 901a (i.e., the light-transmission layer thickness d1=25 μm) or the information recording layer 901d (i.e., the light-transmission layer thickness d1~d4=100 μm), the greater the generated spherical-aberration becomes (i.e., the greater its absolute value becomes). As the optimum material thickness A of the objective lens 501, a substantially average value is used of the thickness of a light transmission layer from the incidence-side surface of the optical-information recording medium 901 up to each information recording layer 901a to 901d. This makes it possible to equally divide the amount of a fifth-order spherical aberration which is generated when the focal point is brought to each information recording layer 901a to 901d. Besides, it makes it possible to restrain a spherical aberration which is caused when it coincides with the information recording layer 901a on the incidence-nearest side and a spherical aberration which is caused when it coincides with the information recording layer 901d on the deepest side.

On the other hand, as shown in FIG. 3, based on the correlation between the thickness of a light transmission layer and the movement distance of the convex lens 30b in the case of two collimating lenses, the amount of a third-order spherical aberration to be generated is proportional to the thickness of a light transmission layer through which a beam of light passes. In sum, the amount of the generated third-order spherical aberration as well as the amount of the generated fifth-order spherical aberration is in proportion to the thickness of a light transmission layer through which a beam of light passes. Simultaneously, they come to the minimum around the optimum material thickness A of the objective lens 501.

Therefore, in the case where the generated fifth-order spherical-aberration is equally divided, the optimum material thickness A of the objective lens 501 can be expressed as shown below, using the above described numerical formula (2) for a third-order spherical aberration. Specifically, if the thickness of the light transmission layer between the surface of an optical-information recording medium and the first (i.e., incidence-nearest side) information recording layer 901a is $d_1$, its refractive index is $n_1$, the thickness of each light transmission layer is $d_j$, the refractive index is $n_j$ (herein, j is an integer of $1 \leq j \leq m$ and m is the number of information recording layers), then the optimum material thickness A of the objective lens 501 is expressed by the following formula (1).

$$\frac{N^2-1}{N^3} \cdot A \approx \left( \sum_{j=1}^{m} \frac{n_j^2-1}{n_j^3} \cdot d_j + \frac{n_1^2-1}{n_1^3} \cdot d_1 \right) / 2 \quad (1)$$

Herein, N is arbitrary, and for example, a refractive index (i.e., design refractive index) used when a lens is designed.

In practice, if A is calculated using the above described numerical-value example and N=1.61, then A=62.5.

Herein, it is desirable that the optimum material thickness A be the average value of the thickness of a light transmission layer from the incidence-side surface of the optical-information recording medium 901 up to each information recording layer 901a to 901d. However, if it is within a range of ±20%, the quantity of a fifth-order spherical aberration to be generated can be substantially equally divided. Hence, no problem arises in practical use.

Furthermore, in this embodiment, an optical-information recording medium is provided with four information recording layers. However, the present invention is not limited to this. If it is provided, for example, with several such layers, for example, three or eight, then the same advantages can be obtained.

Moreover, in this embodiment, as a specific numerical-value example, the case is mentioned in which the thickness of each light transmission layer between information recording layers is d1=d2=d3=d4=25 µm. However, the present invention is not limited to this. The thickness of each light transmission layer between information recording layers may also be, for example, d1=55 µm, d2=10 µm, d3=20 µm, d4=15 µm. Or, they may also be d1=60 µm, d2=10 µm, d3=20 µm, d4=15 µm.

Furthermore, in this second embodiment, in the same way as the first embodiment, the aberration correcting means may also be formed by the collimating lens 30 and the collimating-lens actuator 31. Or, a concave lens and a convex lens may also be provided separately from a collimating lens. In that case, a beam of light incident on the objective lens 501 is transformed into a divergent beam or a convergent beam by changing their interval, so that a spherical aberration can be corrected.

Herein, characteristics of this embodiment will be described.

(1) An optical head which concentrates a light beam that is emitted from a light source, through a collimating lens and an objective lens, upon an optical-information recording medium that includes a plurality of information recording layers, wherein: an aberration correcting means for correcting a spherical aberration which is generated according to the thickness of a light transmission layer up to an information recording layer is provided between the light source and the objective lens; and the objective lens is set so that the absolute value of a spherical aberration which is generated when the focal point of the objective lens upon which a parallel beam is incident coincides with the information recording layer of the optical-information recording medium which is closest to its surface on the incidence side is equal to the absolute value of a spherical aberration which is generated when the focal point coincides with the information recording layer on the deepest side. Therefore, the absolute value of a spherical aberration at the time when the focal point of the objective lens meets the information recording layer which is closest to the incidence-side surface and the absolute value of a spherical aberration at the time when the focal point of the objective lens meets the information recording layer on the deepest side are equated. Therefore, when these spherical aberrations are corrected, the percentage at which the light beam which is incident on the objective lens is transformed from a parallel beam to a divergent beam can be equated to the percentage at which it is transformed from a parallel beam to a convergent beam. This makes it possible to equate a change in the quantity of light when a divergent beam is incident upon the objective lens and a change in the quantity of light when a convergent beam is incident. Hence, the capability to record and regenerate information can be easily secured in any information recording layers.

(2) If the thickness of the light transmission layer up to the j-th (herein, j is an integer of $1 \leq j \leq m$ and m is the number of information recording layers) information recording layer from the side upon which the light beam is incident is $d_j$, the refractive index of the j-th light transmission layer is $n_j$, the refractive index of the light transmission layer at the time when the objective lens is designed is N, and the thickness of the light transmission layer is A at which a spherical aberration generated by the objective lens on which a parallel beam is incident is offset in a state where the focal point of the objective lens is coincident between the information recording layer which is closest to the incidence-side surface and the information recording layer on the deepest side, then the objective lens satisfies the following formula (1).

$$\frac{N^2-1}{N^3} \cdot A \approx \left( \sum_{j=1}^{m} \frac{n_j^2-1}{n_j^3} \cdot d_j + \frac{n_1^2-1}{n_1^3} \cdot d_1 \right) / 2 \quad (1)$$

Therefore, a spherical aberration when the focal point of the objective lens comes to the information recording layer which is closest to the incidence-side surface can be easily equated to a spherical aberration when the focal point of the objective lens comes to the information recording layer on the deepest side.

Third Embodiment

Figure 8:
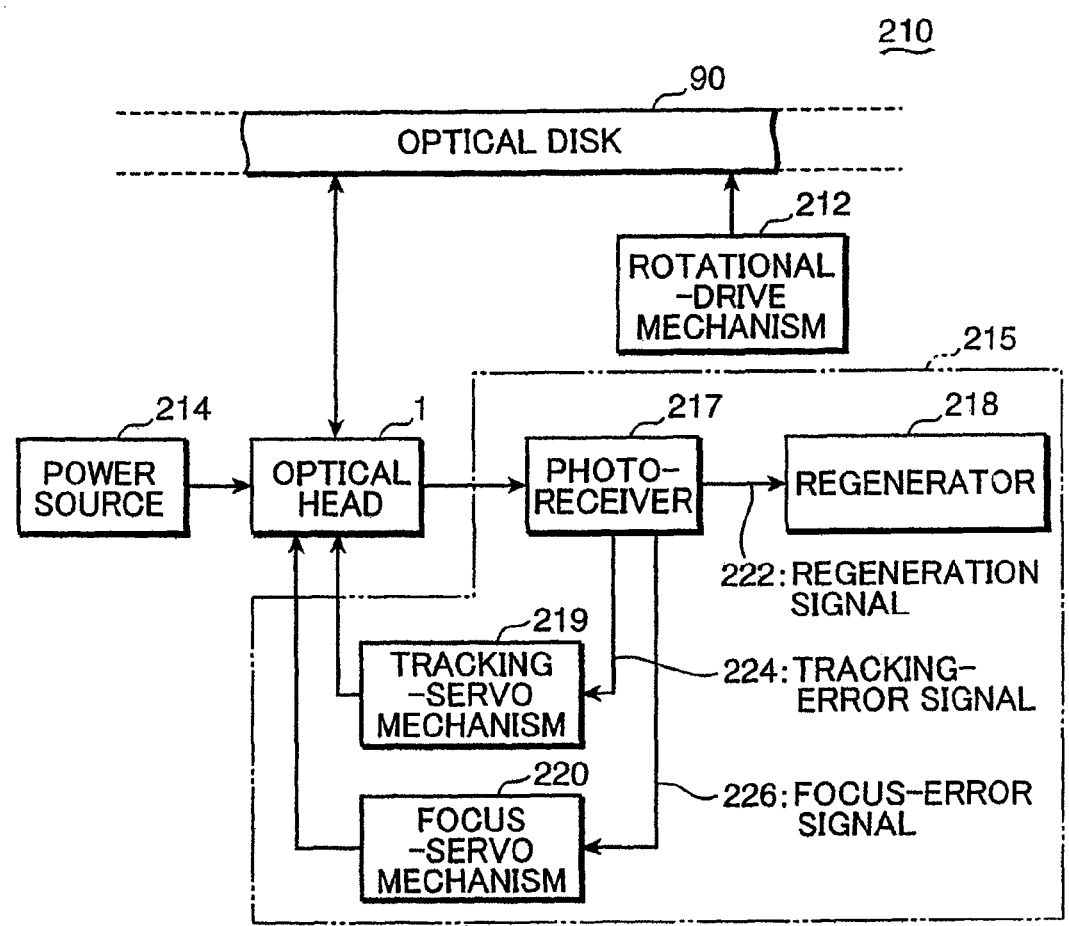
FIG. 8 is a block diagram, showing an information recording-and-regeneration apparatus according to a third embodiment of the present invention.
Figure 9:
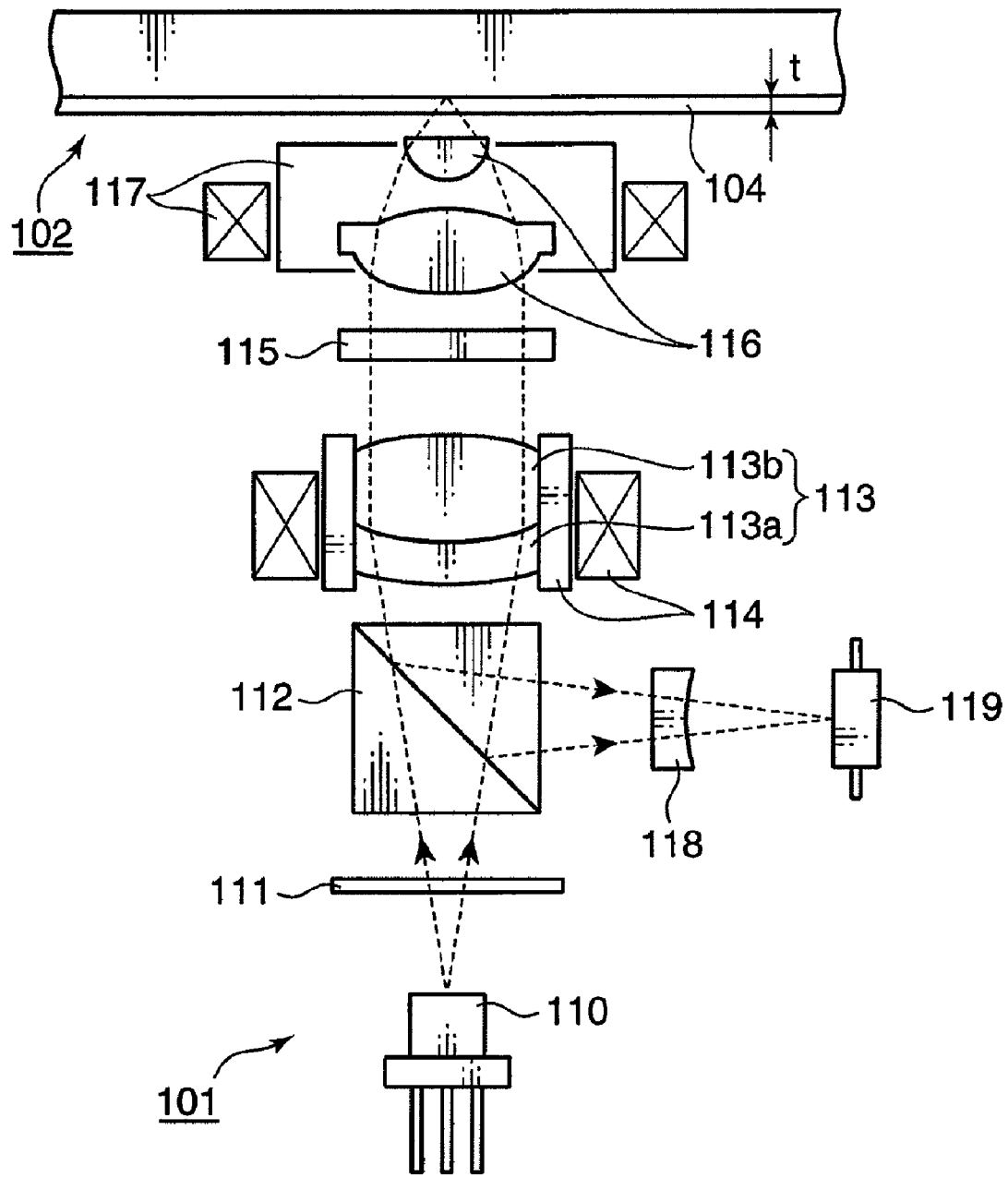
FIG. 9 is a schematic view of a conventional optical head.

FIG. 8 shows an information recording-and-regeneration apparatus according to an embodiment of the present invention. This information recording-and-regeneration apparatus 201 includes: an optical head 1; a rotational-drive mechanism 212; a power source 214; and a control section 215. The control section 215 is provided with: a photo-receiver 217; a regenerator 218; a tracking-servo mechanism 219; and a focus-servo mechanism 220.

The optical head 1 is, for example, the one described as the first embodiment. However, instead of this, it may also be the one described as the second embodiment.

In the information recording-and-regeneration apparatus, a beam of light is emitted from the objective lens 50 in the optical head 1 and is converged on a recording surface of an optical disk 90. Using this converged beam of light, information is recorded, erased and read. The rotational-drive mechanism 212 includes a motor (not shown) and rotates the optical disk 90 which is attached to its shaft. The power source 214 supplies electric power to a circuit board (not shown), the rotational-drive mechanism 212 or the like. The photo-receiver 217 generates a regeneration signal 222, a tracking-error signal 224 and a focus-error signal 226, on the basis of a reflected beam which has branched of in the optical head 1.

Based on the regeneration signal 222, the regenerator 218 is used to regenerate information which is recorded in the optical disk 90. If the information is, for example, visual information and audio information, it converts them into a visual signal and audio signal. The visual signal is inputted in a monitor (not shown) and is displayed as an image. The audio signal is inputted in a speaker (not shown) and is outputted as a voice. Based on the tracking-error signal 224, the tracking-servo mechanism 219 controls the optical head 1 so that a tracking error can be compensated. Similarly, on the basis of the focus-error signal 226, the focus-servo mechanism 220 controls the optical head 1 so that a focus error can be compensated.

Herein, characteristics of this embodiment will be described.

(1) An information recording-and-regeneration apparatus, comprising: the above described optical head; and a control section which, based on a signal from the optical head, executes at least either of the recording of information into the optical-information recording medium and the regeneration of information that is recorded in the optical-information recording medium.

This application is based on Japanese patent application serial No. 2004-330212, filed in Japan Patent Office on Nov. 15, 2004 and serial No. 2005-311397 filed in Japan Patent Office on Oct. 26, 2005, the contents of which are hereby incorporated by reference.

Although the present invention has been fully described byway of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical head comprising:
a light source;
a transforming element for transforming a light beam emitted from the light source into a parallel beam;
an objective lens for concentrating the parallel beam upon an optical-information recording medium that includes three or more information recording layers and corresponding light transmission layers, such that each corresponding light transmission layer has a respective thickness measured from a surface upon which the light beam is incident up to the corresponding information recording layer of the three or more information recording layers, and such that each respective thickness of each corresponding light transmission layer is different; and
an aberration correcting element correcting a spherical aberration generated according to a thickness of a light transmission layer up to an information recording layer, the aberration correcting element being provided between the light source and the objective lens, wherein:
when: (i) an absolute value of a fifth-order spherical aberration, which is generated when a focal point of the objective lens upon which the parallel beam is incident coincides with the information recording layer of the optical-information recording medium on an incidence-nearest side, is |SA5_1|, and (ii) an absolute value of a fifth-order spherical aberration, which is generated when the focal point coincides with the information recording layer on a deepest side, is |SA5_2|, the objective lens satisfies the following formula (3), $$0.8 \leq \frac{|SA5\_1|}{|SA5\_2|} \leq 1.2; \text{ and} \tag{3}$$

when: (i) a thickness of a light transmission layer up to the j-th (j is an integer of $1 \leq j \leq m$ and m is a number of information recording layers) information recording layer from the side upon which the light beam is incident is $d_j$; (ii) a refractive index of the j-th light transmission layer is $n_j$; (iii) a design refractive index of the objective lens is N; and (iv) a thickness of a light transmission layer is A, the light transmission layer having the thickness of A being a light transmission layer at which a spherical aberration, generated by the objective lens on which a parallel beam is incident, is offset in a state where the focal point of the objective lens is coincident between the information recording layer that is closest to the incidence-side surface and the information recording layer on the deepest side, the objective lens satisfies the following formula (1)

$$\frac{N^2-1}{N^3} \cdot A \approx \left( \sum_{j=1}^{m} \frac{n_j^2-1}{n_j^3} \cdot d_j + \frac{n_1^2-1}{n_1^3} \cdot d_1 \right) \Big/ 2. \tag{1}$$

2. The optical head according to claim 1, wherein the objective lens satisfies the following formula (2)

$$\left[ \left( \sum_{j=1}^{m} \frac{n_j^2-1}{n_j^3} \cdot d_j + \frac{n_1^2-1}{n_1^3} \cdot d_1 \right) \Big/ 2 \right] \times 0.8 \leq \tag{2}$$

$$\frac{N^2-1}{N^3} \cdot A \leq \left[ \left( \sum_{j=1}^{m} \frac{n_j^2-1}{n_j^3} \cdot d_j + \frac{n_1^2-1}{n_1^3} \cdot d_1 \right) \Big/ 2 \right] \times 1.2.$$

3. The optical head according to claim 1, wherein
the transforming element includes a concave lens that is disposed on a side of the light source and includes a convex lens that is disposed on a side of the objective lens, and
an actuator is provided which moves the convex lens in a direction where a spherical aberration, generated according to the thickness of the light transmission layer up to the information recording layer of the optical-information recording medium, is canceled.

4. The optical head according to claim 3, wherein the concave lens is a meniscus lens having a light-source-side surface that is concave and having an objective-lens-side surface that is convex.

5. The optical head according to claim 3, wherein
an aperture stop is provided between the objective lens and the transforming element, and
the aperture stop is located near a focal position of the convex lens on the side of the objective lens.

6. The optical head according to claim 5, wherein
when: (i) a focal length of the convex lens is f, and (ii) a distance between the convex lens and the aperture stop is D, the following formula is satisfied $0.8f \leq D \leq 1.2f$.

* * * * *